United States Patent [19]

Barczak et al.

[11] 4,436,681
[45] Mar. 13, 1984

[54] PROCESS FOR PRODUCING IRON OXIDE WEIGHTING MATERIAL FROM IRON CHLORIDE SOLUTIONS

[76] Inventors: Virgil J. Barczak, 2500 NW. 109th St., Oklahoma City, Okla. 73120; Haywood A. Perkins, 2905 Crown Colony Ct., Mobile, Ala. 36609; O. L. Daigle, 2716 NW. 59th St., Oklahoma City, Okla. 73112

[21] Appl. No.: 378,784

[22] Filed: May 17, 1982

[51] Int. Cl.³ ............................................. B28B 11/00
[52] U.S. Cl. .................................. 264/67; 252/8.5 B; 423/633
[58] Field of Search ...................... 252/8.5 B; 423/138, 423/632, 633; 264/67

[56] References Cited

U.S. PATENT DOCUMENTS

| | | | |
|---|---|---|---|
| 2,003,701 | 6/1935 | Stinson . | |
| 3,041,276 | 6/1962 | Monaghan . | |
| 3,867,128 | 2/1975 | Hancock | 252/8.5 B X |
| 3,887,474 | 6/1975 | Senfe et al. . | |
| 3,903,239 | 9/1975 | Berkovich | 423/82 |
| 3,928,529 | 12/1975 | Grulke | 423/138 |
| 3,992,507 | 11/1976 | Cardwell et al. | 423/633 |
| 4,008,775 | 2/1977 | Fox . | |
| 4,092,407 | 5/1978 | Rohrborn et al. . | |
| 4,107,267 | 8/1978 | Hansen | 423/633 |
| 4,119,467 | 10/1978 | Nudelman et al. | 106/100 |
| 4,224,287 | 9/1980 | Ziegenbalg et al. | 423/132 |
| 4,233,162 | 11/1980 | Carney | 252/8.5 C |
| 4,336,242 | 6/1982 | Schmidberger | 423/265 |
| 4,392,940 | 7/1983 | Tao | 44/51 X |

Primary Examiner—Leland A. Sebastian

[57] ABSTRACT

A process for producing an iron oxide weighting material from an iron chloride solution. The iron chloride solution is introduced into an elevated temperature reactor as an atomized mist. The moisture is evaporated from the mist to form iron chloride solids which then react with the steam produced during the evaporation to form particulate iron oxides and hydrogen chloride gas. The iron oxides then are compacted and introduced into a calcination zone maintained at a temperature in the range of from about 400° C. to about 1300° C. The compacted iron oxide is calcined to reduce the surface area of the particles. The calcined iron oxide then is ground to a predetermined particle size.

4 Claims, 1 Drawing Figure

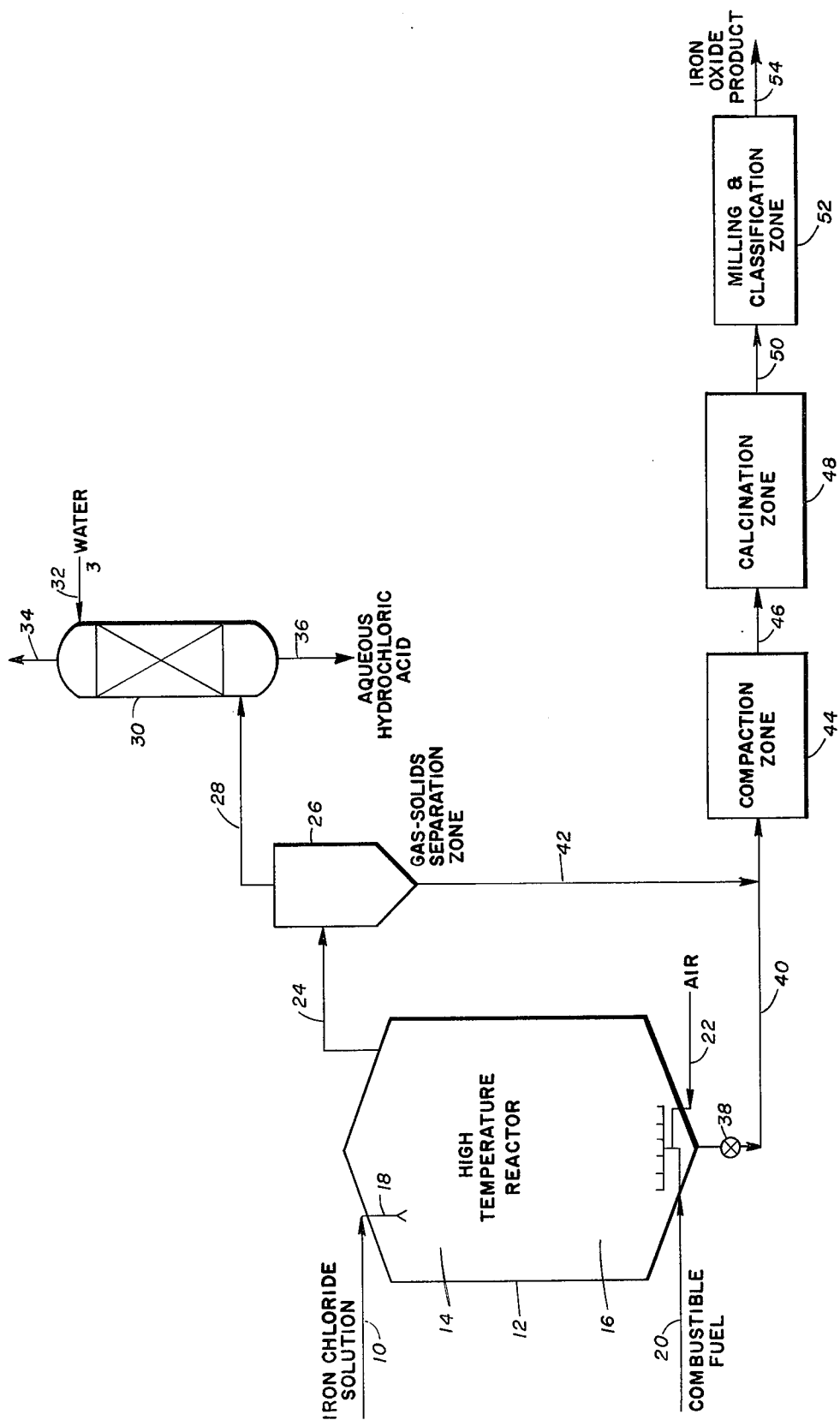

PROCESS FOR PRODUCING IRON OXIDE WEIGHTING MATERIAL FROM IRON CHLORIDE SOLUTIONS

BACKGROUND OF THE INVENTION

1. Field of the Invention

The present invention provides a method for producing an iron oxide weighting material from an iron chloride solution. The weighting material is useful, among other things, in a drilling fluid.

2. Brief Description of the Prior Art

In drilling operations by the rotary method, a drilling fluid is maintained in the hole at all times. During actual drilling the fluid continuously is circulated downwardly through the hollow stem of the drill rod and emerge at the bottom of the hole through passages in the drill bit mounted on the end of the drill rod. The drilling fluid then rises to the surface through the annular space between the drill rod and the wall of the hole and flows into a surface pit for recirculation.

The drilling fluid is required to: (i) lift cuttings from the hole; (ii) control well pressures; and (iii) cool the bit. The removal of rock chips from the cutting face of the bit and the transport of these cuttings to the surface are dependent upon the flow properties of the drilling fluid and the velocity of its movement. Control of entry of fluids such as gas, oil and water into the well from the underground formation is dependent upon the hydrostatic pressure exerted by the drilling fluid.

To prevent the uncontrolled flow of fluids from the underground formation into the well, the drilling fluid must have sufficient density to provide a pressure greater than that exerted by the formation fluids. The greater the density of the drilling fluid, the greater the buoyant effect on the rock cuttings and thus the greater the carrying capacity of the fluid, that is, the quantity of rock cuttings that can be suspended in a given volume of the drilling fluid. The carrying capacity of the drilling fluid depends upon the relationship between shear stress and shear rate that exists under the conditions of flow. The density of the drilling fluid must not be carried too high because excessive hydrostatic pressure can cause the loss of circulation through the well.

Normally, the formation fluids are under pressure at least equal to that of a column of water of equal depth so that densities in excess of water alone are required. To obtain greater densities, materials referred to as "weighting materials" are added to drilling fluids. The most extensively used material for increasing the density of a drilling fluid is ground barite, the common mineral form of barium sulfate. It also is known that iron oxides can be used to replace a portion or all of the barite used as a weighting material in a drilling fluid.

U.S. Pat. No. 2,003,701 discloses the use of from 2 to 10 percent by weight of iron oxide in a bentonite-containing drilling fluid. Patentee states that the addition of rough cellular flake or sponge-like iron oxide to the drilling fluid produces a material increase in the strength of the fluid when used as a hole wall lining in comparison to bentonite alone.

U.S. Pat. No. 3,041,276 discloses a drilling fluid composition comprising a clay-free aqueous suspension containing from about 3 to 8 parts of smelter by-product per part of water. The smelter by-product comprises iron and arsenic in a ratio from about 1.5:1. Patentee states that the smelter by-product and water form a firm gel structure having a weight in the range of from 19 to 32 pounds per gallon.

U.S. Pat. No. 3,887,474 discloses a process for producing iron oxide suitable for use as a weighting agent in drilling fluids from an iron and sulfur containing mineral mass. The mineral mass is roasted to produce iron oxide solids containing less than 2 percent by weight sulfur. The roasted solids are quenched from a temperature above 200° C. to a level below 100° C. while excluding any oxidizing atmosphere. The quenched solids are washed and leached to remove water soluble components and then milled. The milled solids are classified to a particle size below 75 microns and a particle size distribution such that no more than 50 percent is below a particle size of 10 microns.

U.S. Pat. No. 4,092,407 discloses a process for producing an iron oxide of limited magnetic susceptibility for use as a weighting agent. An iron oxide material consisting of calcined fine pyrites having a high magnetic susceptibility is fired at a temperature between 1210° C. and 1400° C. in the presence of an oxidizing atmosphere. The firing is of a duration sufficient to reduce the magnetic susceptibility of the solids to a gram magnetic susceptibility below $1000 \times 10^{-6}$. The solids then are slowly cooled to a temperature of at least below 780° C. in an oxidizing atmosphere at a rate of 1° to 30° C. per minute.

U.S. Pat. No. 4,008,775 discloses a process for scavenging hydrogen sulfide during drilling operations by using a drilling fluid containing iron oxide having the composition $Fe_3O_4$. Patentee states that the $Fe_3O_4$ is prepared by grinding iron ore to a powder and then oxidizing it at a temperature of 400° to 450° F. to form the $Fe_3O_4$. The $Fe_3O_4$ has a surface area at least 10 times as great as magnetite particles of equal size. The $Fe_3O_4$ is admixed with the drilling mud and circulated through the well. The $Fe_3O_4$ reacts with the hydrogen sulfide to form a stable pyrite $FeS_2$. The stable pyrite solids are removed from the drilling mud together with the rock cuttings and the mud then is recirculated.

Various processes, such as steel pickling and titaniferous ore leaching, produce substantial quantities of iron chlorides as by-products through the reaction of iron with hydrochloric acid. It is highly desirable in these processes to recover the hydrochloric acid for recirculation. It would be preferable to recover the hydrochloric acid in a manner such that the iron in the iron chlorides can be converted to a useful material such as iron oxide of a quality suitable for use in drilling fluids.

SUMMARY OF THE INVENTION

The discovery now has been made that an iron oxide weighting material can be produced from a solution of iron chlorides while also recovering the contained chlorine as hydrochloric acid.

In accordance with the present invention, the solution of iron chlorides is introduced into an upper portion of a high temperature reactor by atomization. The reactor is heated by the combustion of gas, oil or the like to maintain a high temperature zone at the base of the reactor. The moisture in the atomized spray of the solution of chlorides is evaporated by the heat rising from the lower portion of the high temperature zone. Upon heating, the spray droplets evolve moisture in the form of steam and are transformed into solid chloride particles. The solid particles then react with the steam and are converted to iron oxide and hydrogen chloride gas. The oxide particles settle to a lower portion of the reactor from which they are recovered. The hydrogen chloride gas passes from the upper portion of the high temperature reactor through a cyclone and then to an absorption column where it is treated and recovered as hydrochloric acid. The oxide particles recovered in the reactor and, if desired, the particles recovered in the cyclone are introduced into a compaction zone. The particles are compacted either with or without a binder to a pour and a tap density in excess of about two times the pour and tap density of the uncompacted particles. The compacted iron oxide particles then are introduced into a calcination zone maintained at a temperature in the range of from about 900° C. to 1300° C. for from about 15 minutes to several hours. The calcined iron oxide then is milled and classified to provide a product having a satisfactory particle size for use in a drilling fluid. It is particularly useful for upgrading low grade barite. Thus, low grade barite has a specific gravity of only about 3.8–4.0. By adding quantities of the product of the present invention to a drilling fluid containing low grade barite it is possible to increase the specific gravity of the fluid to the desired 4.2.

The calcined iron oxide also can be used, by varying the calcination conditions, as a paint pigment, as an ingredient in a cement composition to provide resistance to attack by salt or to replace aggregate as a weighting material and as a heavy media in the cleaning of, for example, coal by gravity separation methods after reduction of the calcined iron oxide to $Fe_3O_4$.

BRIEF DESCRIPTION OF THE DRAWING

The single FIGURE provides a diagrammatic schematic illustration of the process of the present invention.

DESCRIPTION OF THE PREFERRED EMBODIMENT

In accordance with the process of the present invention, a solution of iron chlorides, such as that which results from hydrochloric acid leaching of a titaniferous ore containing iron or from a steel mill pickling process, is fed through a conduit 10 to a high temperature reactor 12. In one embodiment of the invention, the high temperature reactor 12 is provided with an upper section 14 and a lower section 16. The feed is introduced into the upper section 14 of the reactor through atomizers 18 which form fine droplets or a mist which descend through the reactor. The lower portion of the reactor is heated by the combustion of gas, oil or the like. Suitable inlets are provided within reactor 12 for effecting combustion of the fuel introduced through a conduit 20 with air introduced through a conduit 22. The heat rises from the lower section 16 through the interior of the reactor 12 to enter the upper section 14 of reactor 12. As the droplets or mist descends and contacts the elevated temperature combustion gases, the moisture in the droplets or mist evaporates and solid iron chloride particles form. The solid particles settle through reactor 12 toward the lower portion 16 thereof. As a result of the elevated reactor temperature, the dried iron chloride particles react with the steam produced by the evaporation of moisture from the droplets or mist and the excess oxygen present in the combustion gases to form hydrogen chloride gas and fine particles of an oxide of iron. The fine particles or crystallites agglomerate to form larger particles. A substantial portion of the iron oxide then settles to the lower portion 16 of reactor 12 by gravity. The agglomerated crystallites are unsuitable for use as a drilling fluid weighting material since they are easily abraded to form fines that detrimentally effect the rheological properties of the drilling fluid. They are rendered suitable for use in a drilling fluid by the compaction and calcination techniques disclosed hereinafter.

The hydrogen chloride gas together with vaporous water and gaseous combustion products is removed from the upper portion 14 of high temperature reactor 12 through a conduit 24 and introduced into a gas-solids separation zone 26. Zone 26 separates any solid particles entrained in the gas stream, such as iron oxide particles, from the hydrogen chloride gas. The gas-solids separation zone can comprise, for example, a cyclone. The gas is withdrawn from gas-solids separation zone 26 through a conduit 28 and introduced into an absorption tower 30, such as a packed column absorber of conventional design, wherein it is absorbed in water introduced through a conduit 32 to generate hydrochloric acid. The reconstituted or regenerated aqueous hydrochloric acid then is withdrawn from tower 30 through a conduit 36. The remaining uncondensed gases within tower 30 can be vented to the atmosphere or otherwise disposed of in an environmentally acceptable manner through a conduit 34.

The preceeding process description provides one method of producing iron oxide solids from an iron chloride solution. It is to be understood that the iron oxide solids can be produced by any process known by persons skilled in the art that effects the conversion of the iron chloride solution at an elevated temperature into particulate iron oxide.

The solids collected in the bottom of the high temperature reactor 12 are removed therefrom through a conduit 40 by a screw conveyor or the like and introduced into a compaction zone 44. Conduit 40 is provided with a valve 38 to control the solids flow and prevent gases from escaping. Compaction can be achieved, for example, by pelletizing in a disc pelletizer or by forming the iron oxide particles into sheets in a roll compactor, or flakes, briquettes or the like under pressure either with or without a binder. The solids introduced into compaction zone 44 are compacted to a pour density and a tap density at least about twice their original values upon entry into compaction zone 44. More specifically, for example, iron oxide particles produced by this process having an original pour density of 24.3 lbs/ft$^3$ and a tap density of 33.1 lbs/ft$^3$ were compacted to a pour density of 86.8 lbs/ft$^3$ and a tap density of 104.9 lb/ft$^3$ by pelletizing in a disc pelletizer. Preferably, any solid particles separated in gas-solids separation zone 26 are withdrawn through a conduit 42 and admixed with the solids fed to the compaction zone 44 through conduit 40.

The compacted solids are introduced into a calcination zone 48 through a conduit 46. The compacted solids are calcined at a temperature in the range of from about 900° C. to 1300° C. for from about 15 minutes to several hours. Preferably, the temperature is in the range of from about 1000° C. to 1200° C. The calcination insures that any ferrous oxide that is present in the iron oxide is converted to ferric oxide and significantly reduces the surface area of the iron oxide particles by sintering numerous crystallites together. The iron oxide is calcined for a sufficient time to reduce the surface area of the particles to below about 2 m$^2$/g and most preferably to below about 0.5 m$^2$/g. Because the compacted iron oxide has an appreciably greater bulk density than the uncompacted particles, a smaller furnace can be used to calcine a quantity of compacted particles than a similar weight of uncompacted particles. Further, less energy is necessary to achieve the desired degree of sintering in the compacted iron oxide than would be required to sinter the uncompacted iron oxide. The compaction also reduces fines losses resulting from blowover in the calcination zone. The elemination of fines through incorporation into the compacted material also minimizes the size of pollution control equipment necessary to scrub any entrained fines from the discharge gases.

The calcined iron oxide then is introduced through a conduit 50 into a milling and classification zone 52. The mill grinds the iron oxide to a particle size in the range specified by the American Petroleum Institute for materials for use as weighting agents. The ground material then is classified to remove any oversize particles and the fines. The iron oxide product then is withdrawn through a conduit 54 for packaging and sale.

The calcined iron oxide particles produced by the process of the present invention are suited for incorporation into either a water-based drilling fluid containing bentonite or any other clay or an oil-based drilling fluid as a weighting material to improve the density of the fluid. The iron oxide can be admixed in various proportions of from about 10 percent to 100 percent by weight with barite to reduce the quantity of solids that must be admixed to provide a fluid of particular density or to change the rheological properties of the drilling fluid. The iron oxide of the present invention is particularly useful in the formation of drilling fluids having a weight of from about 10 pounds per gallon to about 20 pounds per gallon when admixed in a sufficient quantity with an aqueous solution having a weight of less than about 10 pounds per gallon. The drilling fluid that is produced has superior rheological properties to a comparable weight drilling fluid produced with barite as the weighting material.

The rheological properties of the iron oxide of the present invention are set forth together with the properties of barite and uncompacted iron oxide for an approximately 15 pounds per gallon water-based drilling mud and the properties for the iron oxide of the present invention and barite for an approximately 19 pounds per gallon water-based drilling mud for comparative purposes in the following Tables I and II, respectively.

TABLE II

COMPARISON OF RHEOLOGICAL PROPERTIES OF APPROXIMATELY 19 lb/gal DRILLING FLUID

|  | 100% $BaSO_4$ | 100% Compacted $Fe_2O_3$[1] |
|---|---|---|
| Weight (lb/gal) | 19.1 | 19.0 |
| Plastic Viscosity (cp) | 82 | 39 |
| Yield Point (lb/100 ft$^2$) | 22 | 5 |
| Apparent Viscosity (cp) | 93 | 41.5 |
| Initial Gel (lb/100 ft$^2$) | 2 | 1 |
| 10-Minute Gel (lb/100 ft$^2$) | 12 | 4 |
| API Water Loss (ml) | 9.8 | 14.0 |
| Cake Thickness (1/32") | 6 | 6 |

[1]Iron oxide particulate calcined at 1200° C. for 80 minutes, air cooled and then ground to −75 microns using semi-commercial scale equipment.

The compacted iron oxide is superior to the barite and uncompacted iron oxide in several ways as a weighting material. The plastic viscosity, yield point and apparent viscosity of drilling fluids containing approximately 15 pounds per gallon and 19 pounds per gallon of the compacted iron oxide of the present invention are less than those of drilling fluids containing comparable weights of barite. The gel strength of the compacted iron oxide-containing drilling fluid, an additional important parameter of a drilling fluid, is the same as a barite-containing drilling fluid at initial conditions and significantly lower than the barite-containing drilling fluid after 10 minutes for an approximately 15 pounds per gallon drilling fluid and both initial and 10 minute gel strengths are significantly lower for an approximately 19 pounds per gallon drilling fluid.

The iron oxide is capable of scavenging hydrogen sulfide gas if such gas is encountered during drilling. Heretofore, a separate scavenger such as iron filings has been added to a barite based drilling fluid to scavenge the hydrogen sulfide. Additionally, the iron oxide is in excess of 85 to 90 percent acid soluble which permits underground formations that have been sealed off during drilling operations by the drilling mud to be readily reopened by acidizing the well.

By altering the calcination conditions, an iron oxide can be produced that is suitable for use as a paint pig-

TABLE I

COMPARISON OF RHEOLOGICAL PROPERTIES OF APPROXIMATELY 15 lb/gal DRILLING FLUID

|  | 100% $BaSO_4$ | 100% Compacted $Fe_2O_3$[1] | 100% Uncompacted $Fe_2O_3$[1] | 60% Uncompacted $Fe_2O_3$[1] + 40% $BaSO_4$ |
|---|---|---|---|---|
| Weight (lb/gal) | 15.1 | 15.2 | 15.5 | 15.3 |
| Plastic Viscosity (cp) | 57 | 44 | 94 | 69 |
| Yield Point (lb/100 ft$^2$) | 25 | 8 | 42 | 30 |
| Apparent Viscosity (cp) | 69.5 | 48.0 | 215.0 | 84.0 |
| Initial Gel (lb/100 ft$^2$) | 1 | 1 | 3 | 1 |
| 10-Minute Gel (lb/100 ft$^2$) | 7 | 2 | 17 | 9 |
| API Water Loss (ml) | 6.8 | 10.4 | 19.4 | 13.2 |
| Cake Thickness (1/32") | 3 | 3 | 7 | 6 |

[1]Iron oxide particulate calcined at 1200° C. for one hour, air cooled and then ground to −75 microns.

ment or for incorporation into cement. For these purposes, the iron oxide is calcined at a temperature in the range of from about 400° C. to about 1000° C. for a sufficient time to reduce the chloride concentration of the iron oxide to below about 1 percent by weight and preferably below about 0.5 percent. The calcined particles then are micronized to a size suitable for use as a pigment. Pigment produced by this method was reddish brown in color as a result of several impurities present in the iron chloride solution employed as feed to the elevated temperature reactor.

The calcined iron oxide can be admixed with cement instead of a portion of aggregate to increase the density of the concrete mixture to facilitate its use in, for example, plugging of abandoned wells or in any other use in which increased density is desired. Alternatively, the iron oxide can be substituted for clay or shale in a portland cement to produce a product high in ferric oxide and low in alumina, which is known as erz cement. Such a cement is slow in setting and hardening but is highly resistant to salt action which is highly detrimental to normal portland cement. The process of manufacturing hydraulic cements is well known by persons skilled in the art.

Further, alteration of the calcination conditions permits the production of magnetite for use in heavy media gravity separations. Calcination of the iron oxide under reducing conditions results in the formation of $Fe_3O_4$. The reduction can be effected, for example, by admixing the iron oxide with coal and then feeding this mixture to the calcination zone. The calcined magnetite is ground to a fine particle size to permit the formation of a suitable slurry with water. The ground magnetite then can be used in a differential-density heavy-media process to clean coal in the manner well known to persons skilled in the art. An explanation of such processes is contained in the Kirk-Othmer Encyclopedia Of Chemical Technology, 2nd Ed. Vol. 10 under the topic "Gravity Concentration", pages 695–720, the entire disclosure of which is incorporated herein by reference.

While the present invention has been described with regard to the preferred embodiment thereof, it is to be understood that changes can be made in the process and apparatus employed without departing from the spirit or scope of the invention as set forth in the appended claims.

What is claimed is:

1. A process for preparing a weighting material adapated for use in a drilling fluid which comprises:
   A. compacting a particulate iron oxide byproduct formed during the regeneration of aqueous hydrochloric acid from an iron chloride solution to reduce the porosity thereof and to increase the pour density thereof to at least 85 pounds per cubic foot and the tap density thereof to at least 100 pounds per cubic foot,
   B. calcining said compacted iron oxide byproduct at temperatures in the range of from about 900° C. to about 1300° C. for a period of time sufficient to sinter said compacted iron oxide byproduct and reduce the surface area of said byproduct to less than about 10 square meters per gram and thereafter
   C. grinding said calcined byproduct to a predetermined particle size.

2. The process of claim 1 wherein said compacted iron oxide byproduct is calcined for a period of time sufficient to sinter said compacted byproduct and reduce the surface area of said compacted byproduct to less than about 2.0 square meters per gram.

3. The process of claim 2 wherein said compacted iron oxide byproduct is calcined for a period of time sufficient to sinter and reduce the surface area of said compacted byproduct to less than about 0.5 square meters per gram.

4. The process of claim 1 wherein said calcining of the compacted iron oxide byproduct is carried out at temperatures in the range of from about 1050° C. to about 1200° C.

* * * * *

UNITED STATES PATENT AND TRADEMARK OFFICE
CERTIFICATE OF CORRECTION

PATENT NO. : 4,436,681
DATED : March 13, 1984
INVENTOR(S) : Virgil J. Barczak et al.

It is certified that error appears in the above-identified patent and that said Letters Patent is hereby corrected as shown below:

On the title page insert

-- [73]   Assignee: Kerr-McGee Chemical Corporation,

Oklahoma City, Oklahoma   --.

After "Primary Examiner - Leland A. Sebastian" insert

-- Attorney, Agent, or Firm- William G. Addison --.

Signed and Sealed this

Fifth Day of June 1984

[SEAL]

Attest:

GERALD J. MOSSINGHOFF

Attesting Officer     Commissioner of Patents and Trademarks